United States Patent [19]

Montini

[11] Patent Number: 4,633,820

[45] Date of Patent: Jan. 6, 1987

[54] HIGH-EFFICIENCY THERMAL GROUP

[75] Inventor: Renato Montini, Costermano, Italy

[73] Assignee: C.E.M. S.p.A., Rivoli Veronese, Italy

[21] Appl. No.: 806,582

[22] Filed: Dec. 9, 1985

[30] Foreign Application Priority Data

Dec. 21, 1984 [IT] Italy .................. 84978 A/84

[51] Int. Cl.⁴ .................................... F22B 33/02
[52] U.S. Cl. ........................ 122/37; 122/14; 122/33; 122/156; 122/161; 237/19
[58] Field of Search ............... 122/13 R, 14, 20 A, 122/29, 32, 33, 37, 155 R, 156, 157, 158, 160–161, 166 R, 167–168, 178–179, 184; 237/8 R, 19; 431/347

[56] References Cited

U.S. PATENT DOCUMENTS

| | | | |
|---|---|---|---|
| 1,681,305 | 8/1928 | Moneuse | 237/19 X |
| 1,988,263 | 1/1935 | Casserly | 237/8 R |
| 2,354,507 | 7/1944 | Doherty | 237/19 X |
| 2,552,044 | 5/1951 | Huet | 122/161 |
| 3,237,608 | 3/1966 | Brandl | 237/8 R |
| 4,134,719 | 1/1979 | Velie | 431/347 X |
| 4,242,569 | 12/1980 | Kayser | 237/19 X |
| 4,329,943 | 5/1982 | Schworer | 122/161 X |
| 4,356,794 | 11/1982 | Bouman et al. | 122/14 X |

FOREIGN PATENT DOCUMENTS 2533676  3/1984  France ................ 237/19

Primary Examiner—Albert J. Makay
Assistant Examiner—Steven E. Warner
Attorney, Agent, or Firm—Guido Modiano; Albert Josif

[57] ABSTRACT

A thermal plant comprises a clear blue flame burner and a multi-tank boiler of stainless steel. The burner has a nosepiece welded to the boiler and a rear portion removably fixed to the nosepiece. The rear portion of the burner includes a labyrinth pathway for preheating the combustion air and a thermally insulating conduit for feeding fuel to an atomizer. The boiler has its furnace delimited by two water tanks, i.e. a main peripheral tank and end tank located downstream of the furnace and delimiting with the main tank a gap through which flue gases are conveyed to give off heat to the water in the tanks.

7 Claims, 5 Drawing Figures

HIGH-EFFICIENCY THERMAL GROUP

BACKGROUND OF THE INVENTION

This invention relates to a high-efficiency thermal group comprising a boiler and a clear blue flame burner.

The operation efficiency of a thermal group largely depends on the thermal characteristics and the efficiency of the burner, as well as on the rate of heat exchange between hot flue gases and the water to be heated in the boiler.

As is known, in liquid-fuel firing burners, such as oil firing burners, fuel must be supplied under pressure for being finely sprayed from a suitable atomizer. It may frequently occur that, after repeated cyclical burner ignition and blow-out operations, relatively small amounts of fuel are still fed into the burner at the time when the ignition electrode(s) is (are) turned off. Such fuel amounts, besides being wasted because they remain virtually unburned, tend to build up inside the burner and in time to foul and trigger the formation of sooty deposits on the inner walls of the burner combustion chamber, which results in unburned products being included in the flue gases and thus in the need of servicing the plant.

Moreover, and in particular when the burner is cyclically started, it may occur that the liquid fuel supplied to it is overheated along its feed-in path to the atomizer inside the burner. Thus, a sharp local temperature increase is caused due to the burner inner walls being kept hot inside the boiler between successive cycles. Fuel heating results in sudden expansion of the jet issuing from the atomizer. Accordingly, the flame stability and consistency may be deteriorated which leads to incomplete combustion and poor efficiency.

SUMMARY OF THE INVENTION

It is an object of this invention to provide a new highly effective thermal group which can eliminate or substantially reduce the drawbacks referred to above.

Another object of the invention is to provide a thermal group having a simple and rational structure, whereby its components can be readily assembled and disassembled to make it possible to quickly inspect and easily service even the innermost of parts of the thermal group.

These and other objects which will become apparent hereinafter are achieved, according to the invention, by a high-efficiency thermal group having a boiler and a clear blue flame burner, wherein the said boiler comprises at least one metal head tank containing a fluid to be heated and dilimiting a furnace in which the said burner extends, and at least one metal end tank at least partly located in the said furnace downstream of the burner and in communication with the said head tank, the or each end tank delimiting a gap or interstice with the furnace side wall to controllably confine and convey hot flue gases through it, thereby providing a throttled passage for the hot flue gases in the furnace and obtaining high-rate transfer of heat from the hot flue gases to the fluid in the tanks, and the burner comprises a nosepiece secured to the boiler and extending into the boiler furnace, and a unit removably fixed to the said nosepiece and including a flanged hollow element having its flanged end fixed to the nosepiece end projecting from the boiler a gauged bush carried inside the said hollow elment at its flanged end, whereby the inner light of said hollow element is in direct communication with the said nosepiece, a covering cap which encloses the said hollow elment and defines therewith a peripheral cavity communicating with the inner light of the said hollow element and having an inlet for the combustion air at its end adjacent to the flanged end of the hollow element, whereby incoming combustion air passing through the said inlet is conveyed to follow a winding path through the said peripheral cavity before entering the said hollow element, and a holder carried on the said cap and extending into said hollow element and the said gauged bush, an atomizer carried by the said holder, and a thermally insulating or insulated conduit extending along the said holder for supplying the said atomizer with fuel.

BRIEF DESCRIPTION OF THE DRAWINGS

Further aspects and advantages of this invention will be apparent from the following detailed description of some preferred, though not exclusive, embodiments thereof, given herein by way of not limiting examples with reference to the accompanying drawings, in which.

DESCRIPTION OF THE PREFERRED EMBODIMENTS

Figure 1:
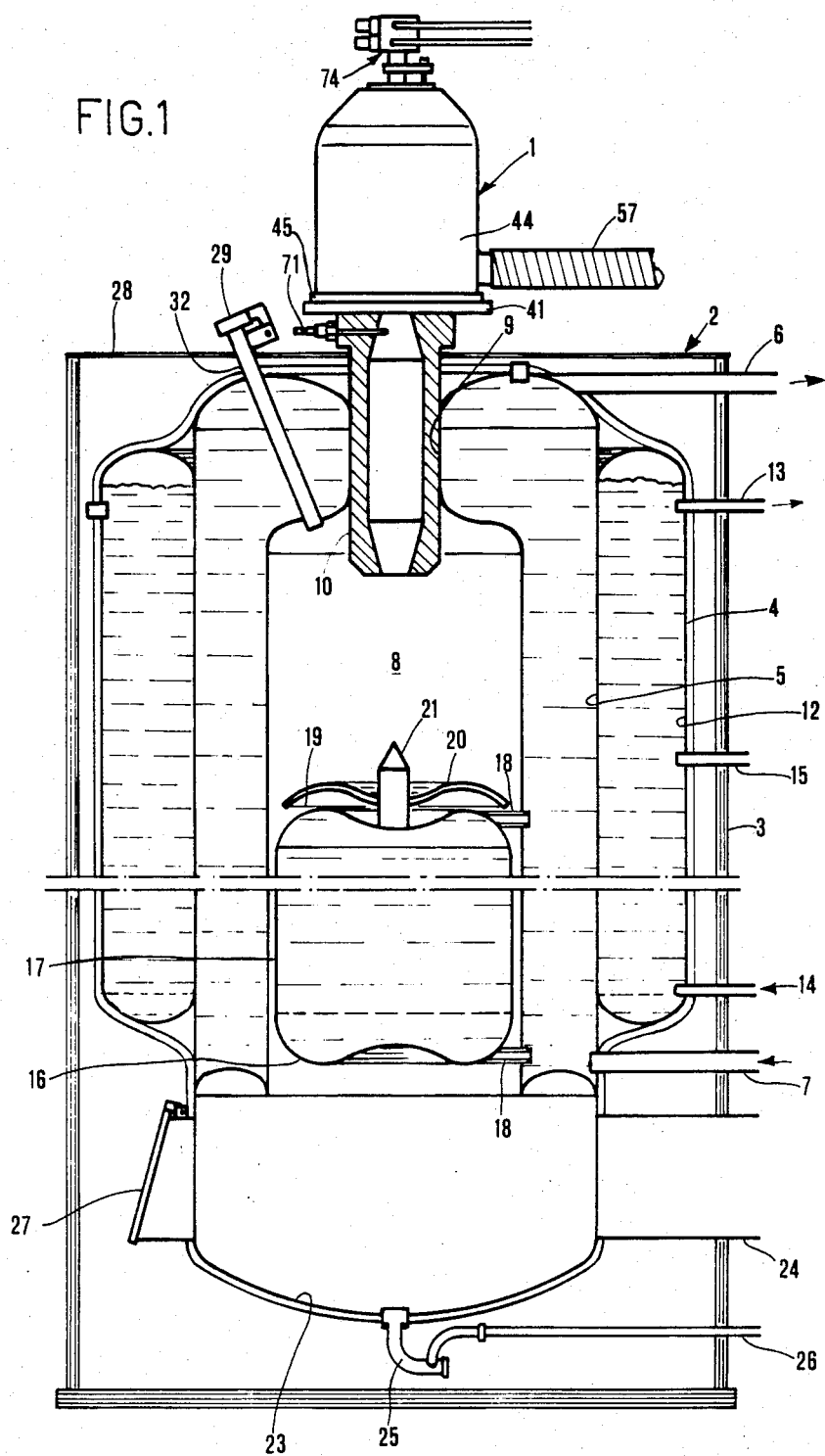
FIG. 1 is a diagrammatic front elevational view showing a first embodiment of a thermal group for operation in vertical layout.

In the accompanying drawings, like or similar parts or components in the various embodiments shown are designated using the same reference numerals.

Figure 2:
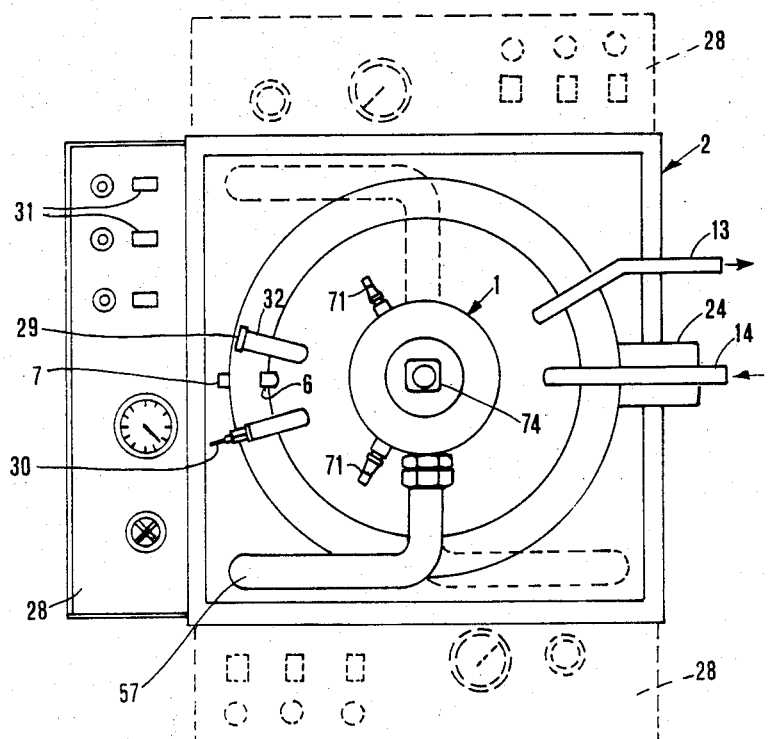
FIG. 2 is a top plan view of the thermal group shown in FIG. 1.
Figure 3:
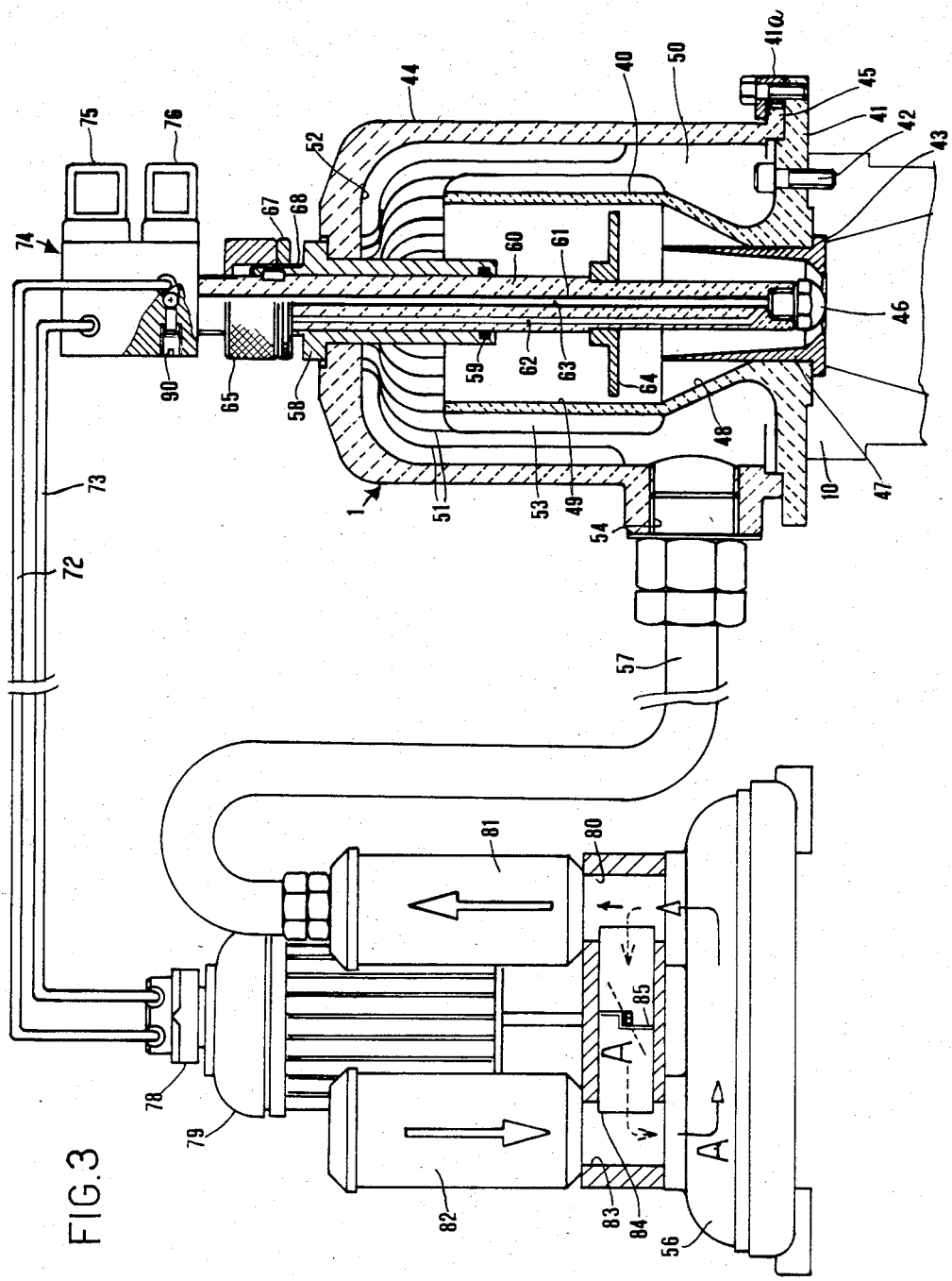
FIG. 3 is a diagrammatic sectional view showing, on enlarged scale, the burner and its respective feed system in the thermal group of FIGS. 1 and 2.

With reference to the thermal group shown in FIGS. 1 to 3, an oil or gas burner is generally indicated at 1 and 2 indicates a boiler on which the burner 1 is mounted.

The boiler 2 is enclosed in an outer case 4 having painted or enamelled sheet metal panels, and is externally insulated by a thick layer of a suitable heat-insulating material, such as ceramic wool or glass wool fashioned to form a protective shroud 3. The boiler 2 comprises a main inner annular head tank or header 5 for heating water to be supplied, through an outlet pipe 6, to a radiator system (not shown) and returning via an inlet pipe 7. The head tank 5 has metal walls, e.g. of stainless steel, and delimits an inner cavity 8 acting as a furnace, as well as a receiving seat 9 for a nosepiece 10 of the burner 1. The seat 9 is located at one end of the cavity 8 and is preferably axially aligned therewith. Around and against the tank 5, there is an outer annular metal tank 12, e.g. of stainless steel, which is designed to be connected, through a delivery pipe 13, return pipe 14 and recirculation pipe 15, to a sanitary water supply system (not shown).

At the other end of the furnace 8, there is provided a downstream preheating tank 16 which has metal walls, e.g. of stainless steel, and delimits, together with the side wall of the furnace 8, a narrow uninterrupted annular gap 17. The tank 16 is supported both at the top (i.e.

at its end in front of the nosepiece 10) and at the bottom by the furnace heart (or innermost wall of the tank 5) by means of one or more pipe sections 18, which also serve to establish direct water communication between tanks 5 and 16, thereby preventing steam pockets from forming in the tank 16.

The front wall 19 of the tank 17, which is opposite the nosepiece 10 and is swept, in operation, by the flame issuing from the burner 1, is protected by a flame-baffling shield 20. The latter is supported and spaced apart from the tank 16, e.g. on an axial pointed pin 21 welded to the head of the tank 16 and is mounted with its convexity facing the nosepiece 10. Thus, the flame and hot flue gas or combustion gases thrown in by the burner 1 are forced to deviate sideways, i.e. from the center toward the periphery of the furnace to enter and move through the annular gap or interstice 17. Through the annular gap 17, the flue gases lap two relatively large metal surfaces, and are forced to form an annular stream having very thin flow lines, thereby ensuring a high rate of heat transfer from the flue gases to the water contained in the tanks 5 and 16. The gap 17 also forms a throttled path for the hot flue gases, which are at least partly mixed and stirred in a turbulent state within the furnace before entering the annular gap. As mentioned above, the water in the tank 16 is prevented from boiling and, forming steam pockets, owing to direct communication with the tank 5 established by the pipes 18. Waste of radiating heat to the exterior of the tank 5, which may contain very hot water, is avoided since any heat given off by the water in the tank 5 is transferred to the water in the outer insulated tank 12.

As shown in FIG. 1, the tank 12 is not completely filled with water since the sanitary water outlet conduit 13 is placed at a distance below its top. This is done to enable the tank 4 also to act as an expansion tank. Thus, the thermal group according to this invention does not need a separate plenum usually required in conventional thermal systems. At the outlet of the annular gap 17, the flue gases are relatively cold (about 70° to 100° C.), and enter a water trap 23 which is in direct communication with a lateral conduit 24 leading to a stack (not shown) and is provided at its bottom with a siphon 25 for draining any condensation water to a sewage system through a pipe 26. The water trap 23 thus acts as a header and may be also provided with a spring loaded explosion-proof inspection door 27.

The boiler 2 may be also equipped with an instrument panel 28 (FIG. 2) which can be placed on anyone of the three available (i.e. except that bearing, inuse, against a building wall) sides of the boiler according to such requirements as the space available, convenience of access, and the like.

Of course, the boiler 2 will have instruments and accessories, such as a window 29 for viewing the flame in the furnace 8 from outside, a thermal probe 30, a control keyboard generally indicated at 31, and the like. The window 29 may be hinged to the outer end of an inspection tube 32 so as to act as an automatically opening cap to release any pressure surges occurring in the furnaces 8, e.g. upon starting the burner 1. The cap 29 can also automatically close the tube 32 by gravity especially if it is set on an inclined surface to the horizontal.

To increase the power of the thermal group, in general one must obviously increase the power of the burner. However, this can be obtained within limits, by simply increasing the length of the furnace 5, the other dimensions remaining unchanged.

The burner 1 has preferably, its nosepiece 10 welded to the seat 9 in the boiler, and comprises an annular bell-like inner hollow body 40 having a flanged end 41 which can be fixed, e.g. by bolts 42, to the external end of the nosepiece 10, a bush 43 having a gauged light and being seated in the flanged end 41 of the hollow body 40, and a cap or cover 44 flanged at 45. The cover 44, as described below, supports an end atomizer 46 cantilever-fashion and is removably fixed to the flange 41 of the body 40 by means of quickrelease revolving plugs 41a. More specifically, the bell-like body 40 has its inner light including a cylindrical narrow end section 47 at the flange 41 which delimits a seat for the bush 43, an intermediate frusto-conical section 48 flaring out from the section 47, and an enlarged cylindrical end section 49. The flanged cap 45 delimits a substantially cylindrical inner cavity 50 which is preferably coaxial with the inner cavity of the bell-like body 40 and provided with a plurality of length-wise-extending radial fins 51, e.g. arranged at a uniform angular distance from one another and extending from a bottom wall 52 through 2/3 of its sidewall length. Longitudinal fins 53 are also provided on the outer wall of the cylindrical section 49 of the hollow body 40. The inner cavity 50 can be fed with combustion air through a side inlet opening 54 which is formed at the flanged end 45 and is in communication with a blower or fan 56 through a (flexible) conduit 57. Owing to the configuration of the inner cavity 50 and to the provision of the bell-like body 40, the combustion air supplied by the fan 56 first sweeps the conical section and flange 41 of the bell-like body which, in use, are normally hot parts, and then, also thanks to the fins 51 and 53, it follows a winding or labyrinth path, i.e. it moves along the annular interstice between the bell-like body 40 and cap 44, towards the bottom wall 52 where it is deflected to enter the bell-like body 40.

Through the bottom wall 52 of the cap 44, a bush 58 is supported cantilever-fashion and extends inside the bell-like body 40. A conduit 60 is slidably and sealingly mounted in the bush 58 through one or more seals 59, and extends inside the hollow body 40 to reach the head of the bush 43. On its free end or tip the conduit 60 carries the atomizer 46.

The conduit 60 has two longitudinal ports, i.e. an axial port 51 and a lateral port 62 extending substantially parallel to the axial port. Both ports 51 and 62 communicate with the inlet port of the atomizer 46. A small tube 63 of thermally insulating material is inserted in the port 61. The conduit 60 supports a disk 64 which is located in the cylindrical section 49 of the bell-like body 40 near the conical section 48 to provide a throttling action for the incoming combustion air which is annularly distributed to pass around the disc periphery. Thus, the velocity of the combustion air increases just before the air is subjected to turbulent mixing downstream of the disc 64 between the bush 43 and the frusto-conical section 48, i.e. before entering the nosepiece 10 through the bush 43 and around the atomizer 46.

Figure 4:
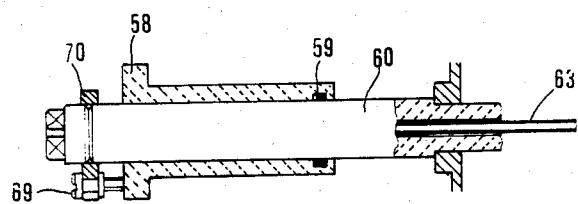
FIG. 4 is a sectional view, on enlarged scale, of a modified embodiment of a control device.

The position of the conduit 60 in the bush 58, and accordingly, the position of the atomizer 46 with respect to the gauged bore or light of the bush 43, is adjustable by means of an external knurled ring nut 65 and lock-nut 67 screwed onto the rear threaded extension 68 of the bush 58. According to a modification, such an adjustment can also be carried out, by means of a micrometric screw 69 mounted on a ring 70 secured to the conduit 60 and acting on the bush 58, as shown in FIG. 4.

On the nosepiece 10 in a position close to the bush 43, there are provided one or more ignition plugs or electrodes 71 (FIGS. 2 and 3).

The tube 63 and conduit 62 communicate with a respective conduit 73, 72 by way of a two-way control device generally indicated at 74 and comprising two solenoid valves 75 and 76. The conduit 72, connected to the valve 76 and tube 63, extends from the delivery end of a fuel feed pump 78 driven by an electric motor 79, whereas the conduit 73 forms a fuel return line to the pump 78. The solenoid valves 75 and 76 are controlled, in use, by a general control unit (not shown). The solenoid valve 75 can be controlled by a control device 90 so as to allow some of the fuel to return to the pump 78. This means that the atomizer 46 will be fed with fuel at a reduced pressure on starting, thereby ensuring a smooth start without causing any undesirable strong blasts through the stack.

With this arrangement, outflows of fuel under pressure in the nosepiece 10 (combustion chamber) at the end of each firing cycle are prevented. The fuel residue remaining in the inner tube 63, when the valve 76 is closed, will be drained along the port 62 and through the valve 75 into the return conduit 73 rather than reaching the atomizer 46. Accordingly, both the atomizer and the combustion chamber can be kept clean.

The motor 79 is also arranged to drive the fan or blower 56, whose delivery 80 communicates with the tube 57 through a sound-reducing filter 81. A sound-reducing filter 82 is also provided at the suction opening 83 of the fan.

Advantageously, the blower 56 has a by-pass line 84 which is controlled by a valve 85 such as a throttle valve controlled by the control unit. When no voltage is applied to the electrodes 71, and hence when the burner is off, the valve 85 is closed to prevent cold air from being supplied to the boiler. When the burner is on, the valve 85 keeps the by-pass line 84 open, and thus, the burner is supplied with the amount of combustion air that the thermal group can take in, any excess air being recirculated (arrows A) through the blower. With this arrangement, a more stable flame is obtained within the boiler furnace and no power is wasted.

The operation of the above described thermal group should be apparent. As the tube 63 is made of insulating material, the fuel is not pre-heated before reaching the atomizer, and this even after repeated firing cycles, when the burner components such as conduit 60, bush 58, and cap 44 are already hot. This is an important factor both for complying with specific regulations in force in many countries and for providing a uniform and stable flame within the furnace 8.

As already explained above, the combustion air supplied by the blower to the cavity 50 is forced to follow a winding path before entering the combustion chamber 10, and this mainly for two reasons, i.e. to effectively pre-heat the incoming combustion air and to thoroughly mix the air before taking part to the combustion.

On cutting the voltage off, the motor 79 stops, the valve positions are reversed and the burner is put off.

Figure 5:
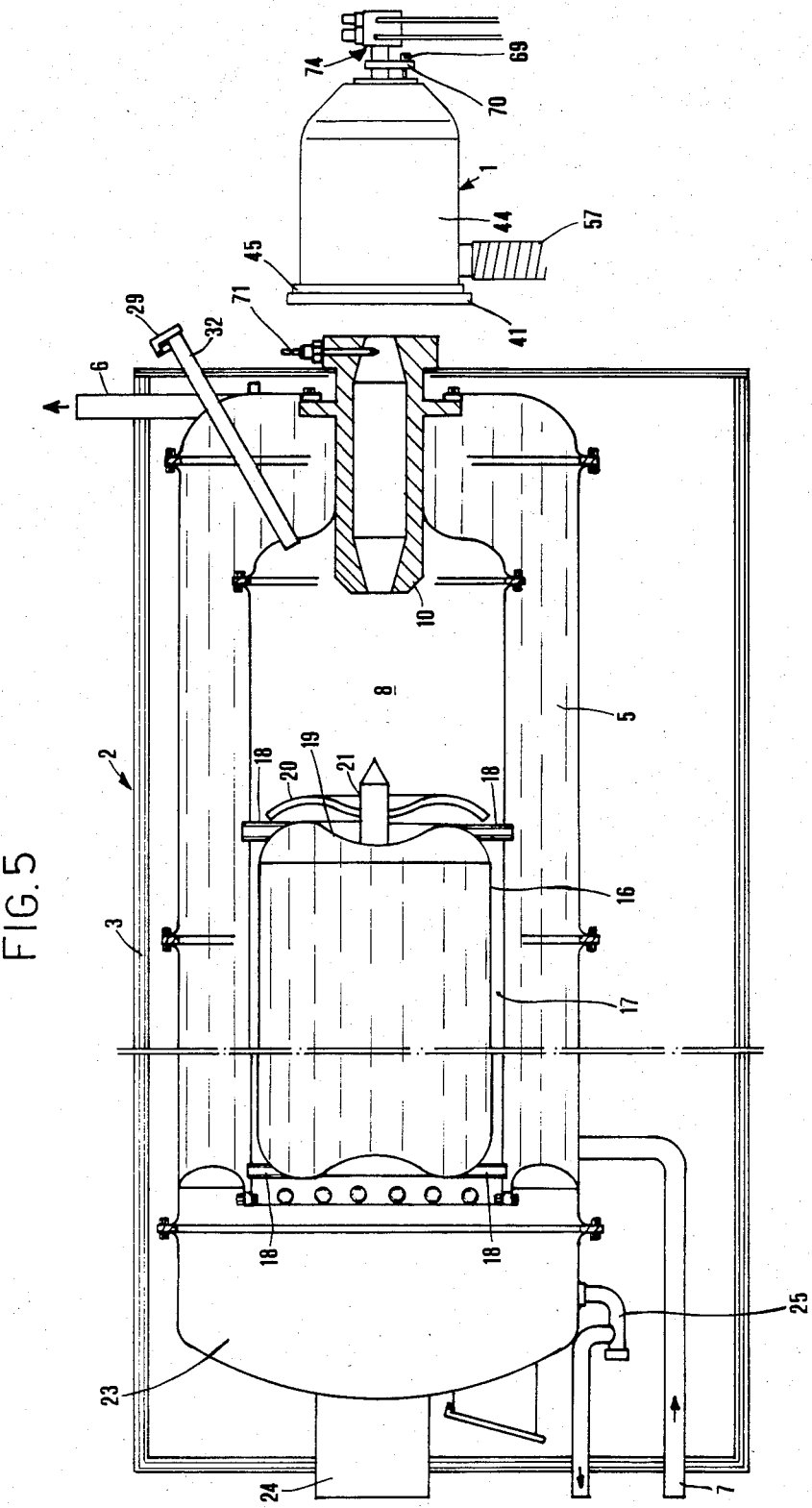
FIG. 5 shows an elevational and longitudinal section view of a second embodiment of a thermal group for operation in horizontal layout.

The embodiment shown in FIG. 5 is similar to that just described, except for its modular construction and its horizontal layout when in operation. Such embodiment is suitable for thermal groups rating higher than 100,000 kcal/hour. No outer tank is provided since in general high power groups do not require a sanitary water supply system. The tank 5 comprises flanged modules which can be bolted to one another, thereby making it possible to transport the components of the thermal group through narrow passages before installation.

The two presently preferred embodiments of the thermal group described above are susceptible of many modifications and alterations within the scope of the present invention as set forth in the appended claims.

Thus, for example, should the boiler tanks 12 and 5 be advantageously made of stainless steel, the boiler can also operate at relatively low temperatures, e.g. 40° C. to 60° C., which are suitable temperatures for connection in series to solar panels or for floor heating applications. It will be noted that owing to highly efficient heat exchange through the annular gap 17, the exhaust or flue gases entering the water trap 23 have relatively low temperatures, in the range of 70° C. to 100° C. Thus, in the water trap 23 condensation of the stem suspended in the exhaust gases occur, which results in additional heat being released and regenerated.

Moreover, the provision of a boiler having one or more tanks 12,5,16 with a relatively large internal light, rather than a conventional tube nest, eliminates a number of problems connected with scale formations on the inner walls of the boiler.

I claim:

1. A high-efficiency thermal group having a boiler and a clear blue flame burner, wherein the said boiler comprises at least one metal head tank arranged to contain a fluid to be heated and delimiting a furnace in which the said burner extends, and at least one metal end tank at least partly located in the said furnace downstream of the burner, and in fluid communication with the said head tank, the or each end tank delimiting a gap or interstice with the furnace side wall to controllably confine and convey hot flue gases through it, thereby providing a throttled passage for the hot flue gases in the furnace and obtaining high-rate transfer of heat from the hot flue gases to the fluid in the tanks, and the burner comprises a nosepiece secured to the boiler and extending into the boiler furnace, and a unit removably fixed to the said nosepiece and including a flanged hollow element having its flanged end fixed to the nosepiece end projecting from the boiler, a gauged bush carried inside the said hollow element at its flanged end, whereby the inner light of said hollow element is in direct communication with the said nosepiece, a covering cap which encloses the said hollow element and defines therewith a peripheral cavity communicating with the inner light of the said hollow element and having an inlet for the combustion air at its end adjacent to the flanged end of the hollow element, whereby incoming combustion air passing through the said inlet is conveyed to follow a winding path through the said peripheral cavity before entering the said hollow element, and a holder carried on the said cap and extending into said hollow element and the said gauged bush, an atomizer carried by the said holder, and a thermally insulating or insulated conduit extending along the said holder for supplying the said atomizer with fuel.

2. A thermal group according to claim 1, wherein the said holder has adjusting means for regulating its relative position on said cap whereby the said atomizer can be adjustably moved to and away from the said gauged bush.

3. A thermal group according to claim 1, further comprising a blower whose delivery communicates with the burner for supplying combustion air thereto, the said blower having an internal by-pass line and a valve arranged to cut-off the said by-pass line, thereby keeping the said by-pass line open while said burner is in operation to be supplied with the amount of combustion air it can take, and closed while the said burner is off to prevent cold combustion air from being supplied thereto.

4. A thermal group according to claim 1, wherein the inner wall of said cap is formed at least partly with longitudinal and/or radial fins arranged to guide and give off heat to the combustion air flowing through the said peripheral cavity.

5. A thermal group according to claim 4, wherein the said hollow flanged element is provided at least partly with outer longitudinal fins designed to cooperate with the fins on the said cap.

6. A thermal group according to claim 1, wherein the said holder carries or includes a return conduit for the fuel in the said atomizer.

7. A thermal group according to claim 6, further comprising a two-way control device having a valve arranged to control fuel supply to the said thermally insulating or insulated conduit and a valve for controlling fuel residue drainage along the said return conduit.

* * * * *